Figure 1:
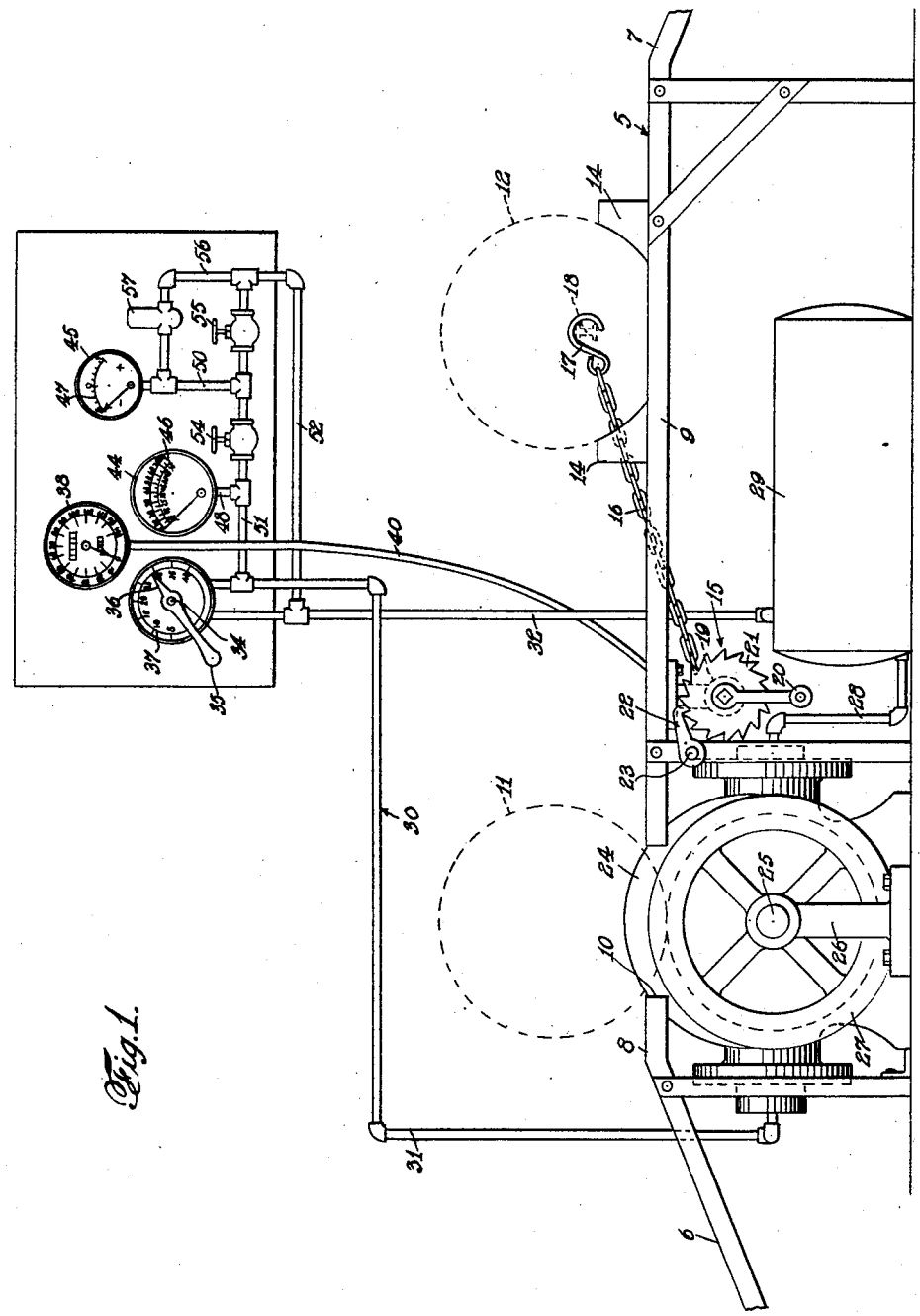

May 5, 1936.   M. J. LEWIS   2,039,428
TESTING APPARATUS
Filed Dec. 11, 1934   2 Sheets-Sheet 1

INVENTOR.
Morgan J. Lewis
BY Williams, Rich & Morse
ATTORNEYS.

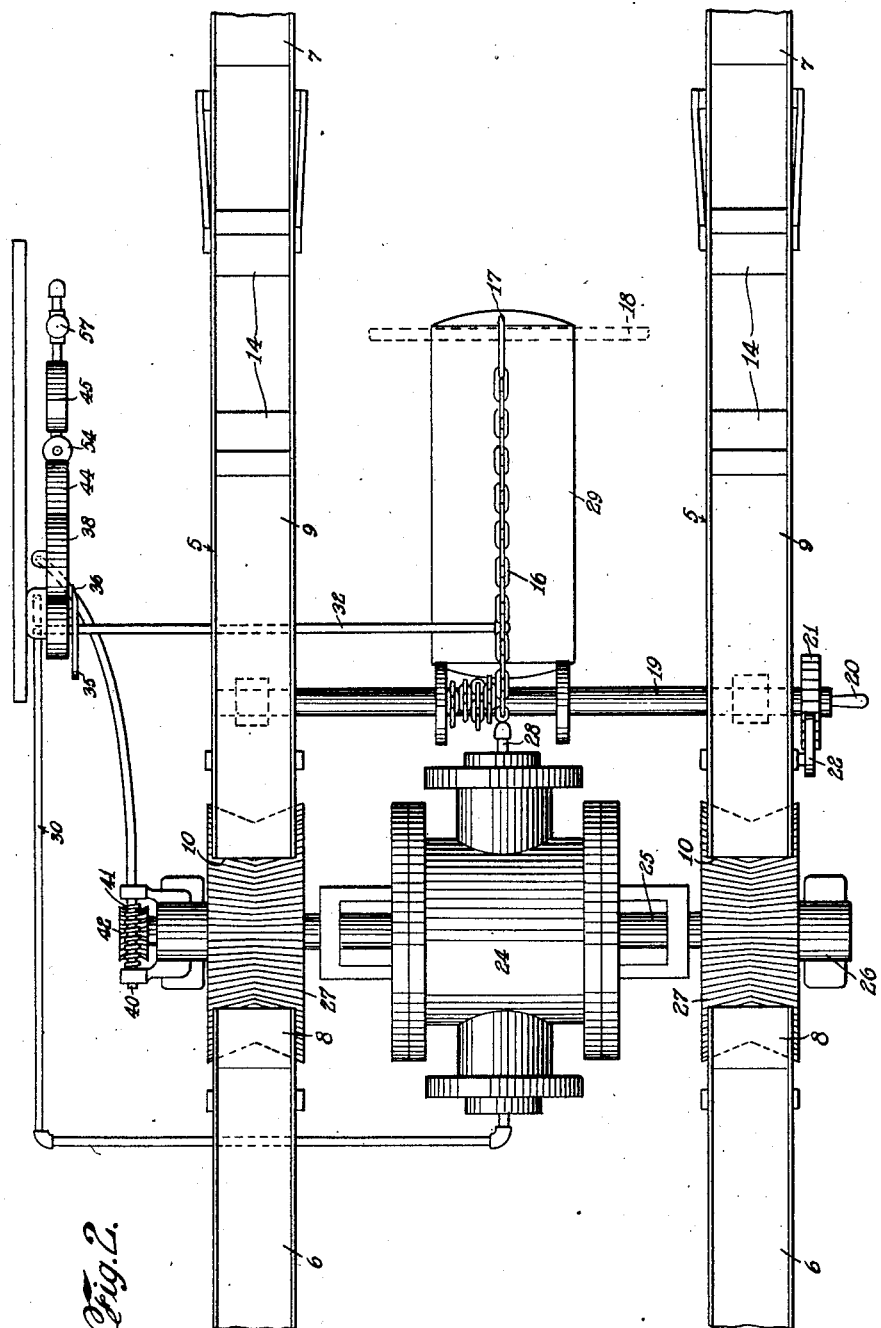

Patented May 5, 1936

2,039,428

UNITED STATES PATENT OFFICE 2,039,428

TESTING APPARATUS

Morgan J. Lewis, Philadelphia, Pa.

Application December 11, 1934, Serial No. 756,921

13 Claims. (Cl. 265—24)

This invention relates to testing apparatus for automotive vehicles.

An important object of the invention is to provide an improved apparatus of the character mentioned which is simple in construction, reliable in operation and by which various tests with regard to the performance of a motor vehicle may be carried out in situ under conditions similar to those encountered in actual road service.

To the above ends the invention contemplates an endless track on which the vehicle may be held against translatory movement, the track being operated through the medium of the power plant of the vehicle and the traction wheels thereof and connected to a suitable dynamometer unit, which may be of the hydraulic type and may include a rotary pump, the inlet of which is connected to a liquid supply reservoir and the outlet of which is connected to a liquid conduit, including a pressure pipe and a return pipe, the latter of which leads to that reservoir, there being disposed within the conduit an adjustable load-valve, which is associated with a scale, graduated to represent various loads in terms of gradients, the pressure pipe of the conduit being connected to a power meter, including a power indicator graduated to indicate roughly the output of the vehicle motor in terms, for example, of horse-power at various loads, as indicated by the scale of said load-valve, and at various road speeds, as indicated by a speedometer unit, which is so geared to the shaft of the pump as to accurately register road speeds of the endless track, the power indicator being adapted to cooperate with an auxiliary indicator, which forms a part of the power meter and is graduated in terms corresponding to those of the first indicator but scaled to represent micrometric divisions of the scale of the first indicator, the auxiliary indicator being more sensitive or delicate in character than the first indicator so as to facilitate the obtaining of accurate and precise readings under various test conditions and associated with pressure-relief means which is adapted to automatically so function as to obviate under any abnormal conditions any possible damage to the relatively sensitive mechanism of the auxiliary indicator.

Other objects and advantages of the invention will become apparent from the following description when taken in connection with the accompanying drawings, in which—

Fig. 1 is a view in elevation of the apparatus embodying the present invention, and Fig. 2 is a plan view of that apparatus.

Referring to the drawings, wherein is illustrated what is regarded at present as the preferred form of the invention, the numeral 5 indicates a frame-like support, onto which an automobile to be tested may be driven up inclined ways 6, and off of which the automobile may be driven down similar ways 7, the ways 6 and 7 being in the form of channel irons adapted to accommodate the tread of the automobile wheels and being, respectively, connected at their upper ends to similar channel irons 8 and 9 which terminate short of each other at the rear of the apparatus, thus affording spaces 10 adapted to accommodate the tread portion of the rear wheels of the automobile, such wheels being indicated in outline at 11 in Fig. 1, whereas the front wheels of the automobile are therein indicated in outline at 12.

As will hereinafter more clearly appear, it is essential to safety that the automobile be held against lateral displacement on the support 5 under all conditions, and to that end there are provided for each front wheel a pair of chock blocks 14, adapted to assume wheel-restraining positions as shown in Fig. 1; and as a further precaution against forward displacement of the vehicle, there is provided a winch mechanism 15, which includes a chain 16, having at its forward end a hook 17, adapted to be connected to the axle 18 of the automobile as shown, the chain 16 being secured at its rear end to a horizontally disposed shaft 19, journalled at opposite ends to the channel irons 9. In order that the chain 16 may be easily wound onto the shaft 19 for the purpose of rendering it taut, the shaft is provided at its outer end with a handle 20, and in order that the shaft may be held against rotation after tightening the chain, it is provided with a ratchet wheel 21, which is adapted to be engaged by a holding pawl 22, the pawl being pivotally supported, as at 23, and adapted to be disengaged from the ratchet wheel when it is desired to release the chain to enable the automobile to be moved from the support 5.

Suitably located with respect to the frame-like support 5, is a dynamometer unit, which may be of the hydraulic type and is herein illustrated as including a rotary pump 24, the rotor shaft 25 of which is journalled at opposite ends in bearings 26 and is connected to a pair of tread-wheels 27, serving as an endless track for the traction wheels 11 of an automobile undergoing test as will be readily understood from an inspection of Fig. 1. The inlet of the pump 24 is connected by a pipe 28 to a liquid supply reservoir 29, from which liquid is delivered to the pump and to which liquid is returned from the outlet of the pump by way of a liquid conduit 30, including a pressure pipe 31 and a return pipe 32. Disposed within the liquid conduit 30, is a suitable impedance or load-valve, not shown, having a valve shaft 34, to which is connected an operating handle 35, one end of which is tapered to provide a pointer 36, with which is associated a stationary scale 37. The scale 37 is graduated to represent various loads, according to the extent to which the conduit 30 may be restricted by the load-valve, the loads being herein shown in terms of gradients ranging from "0" to "40" per cent.

In order to facilitate the carrying out of road speed tests, and in order to enable various other tests to be easily made with the apparatus embodying the present invention, there is provided a speedometer 38, of standard design, which is operatively connected to the rotor shaft 25 of the pump by a flexible shaft 40, which is of the sheath-covered type and is provided with a worm 41, meshing with a worm gear 42, secured to the rotor shaft.

For use in cooperative association with the load-valve of the liquid conduit 30, there is provided a power meter unit, which includes a pair of inter-connected power indicators 44 and 45, the latter of which is adapted to operate in conjunction with and micrometrically in relation to the former. Although the power indicators 44 and 45, as herein employed, are adapted to indicate power output of the automobile engine and may therefore be graduated in terms of horse-power, they are essentially pressure devices of any suitable gauge-type, the scale 46 of the former being roughly graduated from zero upwardly in denominations of five horse-power, and the scale 47 of the latter being graduated in units of one horse-power in opposite directions from a zero point, to make possible the taking of negative and positive readings from zero to minus "5" and plus "5" with relation to that point. It will be noted that the pressure inlets 48 and 50 of the indicators 44 and 45 are connected to the pressure pipe 31 of the liquid conduit 30 by a pressure, or pressure-transmitting, pipe 51, having a return branch 52 connected to the return pipe 32 of the liquid conduit 30. In order to establish a given setting for the indicators 44 and 45, the pressure pipe 51 is provided with a pair of pressure control valves 54 and 55, the former, which is located intermediate the junctures of the pressure inlets 48 and 50 with the pressure pipe 51, being adapted for use in the control of the indicator 44, and the latter, which is located intermediate the return branch 52 and the juncture of the pressure inlet 50 with the pressure pipe 51, being adapted for use in the control of the indicator 45. In order to guard the relatively delicate mechanism of the indicator 45 against possible damage under the action of undue pressure, resulting, for example from an excessive adjustment of the valve 55 toward closed position, there is provided a pressure by-pass, which includes a shunt conduit 56, leading around the valve 55 from the pressure inlet 50 to the return branch 52, the shunt conduit having disposed therein a pressure-relief valve 57, of any well known type wherein a spring is employed to hold it closed against pressure until such time as sufficient pressure is encountered to cause it to open. In the present instance, the spring of the valve 57 should be such as to permit the valve to release at a pressure equal to or very slightly greater than that required to effect movement of the hand of the indicator 45 from its negative position of minus five to its positive position of plus five, which movement is representative of a distance corresponding to the pressure required to move the hand of the indicator 44 from "0" to "10", or from "10" to "20", and so on, it being noted, as will hereinafter more clearly appear, that although the indicator 45 may be read both positively and negatively with respect to the zero-point of its scale 47, such point is in no instance indicative of zero pressure and is merely employed to establish a coordinated relation between the indicators 44 and 45 under actual operating or test conditions, as will hereinafter more clearly appear.

In order to simplify the procedure to be carried out in connection with various tests, and in order to so extend the field of application of the invention as to make possible the carrying out of a great variety of tests, advantage may be taken of certain basic factors, which are well known with regard, for example, to different makes of automobiles. In this connection, a suitable chart may be employed as a handy reference, setting forth the horse-power required to propel each known make of automobile up various grades at various speeds. Such a chart would show, for example, that forty horse-power is required to propel a particular automobile up a twenty per cent grade at forty miles per hour, whereas with another make of automobile the chart might indicate that forty-five horse-power is required to propel that vehicle up the same grade at the same speed.

In order to illustrate the manner in which the aforementioned chart may be utilized to advantage, let it be assumed that an automobile, which is shown by that chart to require forty horse-power to propel it up a twenty per cent grade at forty miles per hour, is positioned on the frame-like support 5 with its rear wheels 11 resting on the endless track, namely, the tread wheels 27, and with its axle 18 connected to the winch mechanism 15, as shown in Fig. 1; that it is desired to test the motor for carburetor adjustments; that the load-valve in the liquid conduit 30 is open, and that the pressure control valves 54 and 55 are also open. Under the foregoing assumed conditions, liquid is moved by the pump 24 from the reservoir 29 through the pressure pipe 31 of the liquid conduit and is returned to that reservoir by way of the return pipe 32, one portion of the liquid being directed through the pressure pipe 51 and its associated branch 52, and another portion of the liquid being directed through the load-valve which is interposed between the pressure pipe 31 and the return pipe 32. The procedure preparatory to making the carburetor adjustments is as follows: First, the load-valve is moved by its associated handle 35 to a position corresponding to a twenty per cent grade, in which position the pointer 36 will register with graduation "20" of the stationary scale 37, whereupon the valve 54 is closed a sufficient extent to cause the pointer of the indicator 44 to assume registration with the graduation "35" of the scale 46 as the motor throttle is adjusted to attain a road speed reading of forty miles per hour on the speedometer 38. After making the foregoing adjustments, the valve 55 is closed a sufficient extent to cause the pointer of the indicator 45 to move from negative "5" position to "0" position, the pointer of the indicator 44 being at the same time caused to move from its position at graduation "35" into registration with graduation "40" on the scale 46. From the foregoing, it will be understood that with the load-valve adjusted to a given setting of, say, "20", it becomes a relatively simple matter to so manipulate the motor throttle while adjusting the valves 54 and 55, as to attain a road speed of forty miles per hour while predetermining the pressures necessary to cause the pointers of the indicators 44 and 45 to register respectively with graduations "40" and "0". Inasmuch as the previously described adjustments of the load-valve and the pressure control valves restrict the free delivery-flow of liquid from the pump 24, and inasmuch as the speedometer 38 is so geared to the pump shaft 25 as to accurately indicate road speeds, the indicator 37 and the speedometer 38 and the indicators 44 and 45, when considered collectively, may be employed to simulate actual road operating conditions peculiar to an automobile traveling up a twenty percent grade at forty miles per hour with a forty horse-power consumption. With stable indicator and speedometer conditions, the effect of any carburetor adjustment may be accurately determined by noting the effect on the indicators 44 and 45, reference being had particularly to the latter which is adapted to operate in conjunction with and micrometrically with respect to the indicator 44. If, upon making an adjustment, the pointer of the indicator 45 moves from its zero position toward the left, as viewed in Fig. 1, it becomes apparent that the adjustment is of a detrimental character, whereupon a return adjustment may be made to restore the normal condition and an opposing adjustment made in order to determine whether such opposing adjustment would prove beneficial. In the event the pointer of the indicator 45 moves, in response to the opposing adjustment, from zero position to a positive position with relation to its zero point, it becomes obvious that the opposing adjustment is one which is necessary to motor efficiency and may be adopted in the "tuning up" process, the relative increase in efficiency being determined by the extent to which the pointer of the indicator moves from its zero position toward the right as viewed in Fig. 1.

Although the mode of operation of the apparatus has been defined with particular relation to carburetor adjustments, the same general procedure may be carried out when the apparatus is employed as an aid to one in determining the character and extent of other adjustments that may be necessary in "tuning" the motor to maximum efficiency.

Aside from the fact that the apparatus is adapted for use in enabling one to intelligently and accurately carry out the necessary adjustments of any motor part on which efficiency of the motor depends, the apparatus may be employed in other connections, as for example in the testing of the vehicle speedometer, for both linear and miles-per-hour measurements, against the accurately calibrated speedometer 38 forming a part of the present invention.

Moreover, the apparatus may be employed to advantage in the making of tests with respect to various automotive products, such as oil, gasoline, spark plugs, etc.—all miscellaneous product tests being made by comparing horse-power delivered at the time of such tests with horse-power delivered under similar conditions with given or standard products, such as a particular oil, a particular gasoline, a particular spark plug, etc., although certain of such tests, as for example those involving gasoline, may be run, if desired, with the aid of the speedometer 38 alone, as when it is desired, for example, to determine the grade or brand of gasoline capable of attaining the greatest road speed or the greatest mileage under level or zero grade road conditions.

If it is desired for example to test the motor of a vehicle to determine whether the motor is capable of delivering the maximum horse-power claimed for it by the motor manufacturer, the chart heretofore described as an accessory to the present invention may be consulted for certain data with regard to the particular motor in question for the purpose of determining the maximum speed (road speed) that should be maintained under open throttle conditions and with a given load. For the purpose of illustration, let it be assumed that the horse-power claimed by a manufacturer for a particular motor is seventy, and that the chart shows that for the motor in question a road speed of sixty miles per hour should be maintained at a load-valve setting of "10", as determined by the pointer 36 associated with that valve, when the pressure control valves 54 and 55 of the power meter are so set that the pointers of the indicators 44 and 45 register "70" and "0", respectively. Assuming that the load-valve is in open position, as when its pointer 36 registers with "0" and that the pressure control valves 54 and 55 are also open, the test may be conducted by proceeding as follows: First, the motor throttle is opened to its full extent, whereupon the load-valve is so moved that its pointer 36 registers with the graduation "10", after which the valve 54 is closed a sufficient extent to so decelerate the motor, by reason of the load imposed thereon, that the pointer of the speedometer 38 moves in a counter-clockwise direction from a maximum mile-per-hour reading into registration with graduation "60." If the horse-power claimed by the manufacturer for the particular motor under consideration is correct, the pointer of the indicator 44 should register with graduations "70", but if the horse-power is over-rated the pointer of the indicator would under-register, whereas if the horse-power is under-rated the pointer of the indicator would over-register. If it is desired to determine to a nicety the extent, in terms of horse-power, to which the motor falls short of its claimed output, the following procedure may be adopted: First, the pressure valve 54 is opened a sufficient extent to permit the pointer of the indicator 44 to move to the next lowest graduation, namely, "65", as a result of which the motor will speed up so that the pointer of the speedometer 38 will register slightly above "60", whereupon the valve 55 is closed a sufficient extent to cause the pointer of the speedometer to drop back to "60" and the pointer of the indicator 45 to move from its negative "5" position toward its zero position, so that the deficiency in horse-power may be readily determined from the indicator 45 by noting the extent to which its pointer falls short of the zero-point at the left or negative side thereof as considered in Fig. 1. On the other hand, should it be desired to determine the extent to which the motor exceeds its rated horse-power, the valve 54 is opened a sufficient extent to permit the pointer of the indicator 44 to drop back to the next adjacent graduation, say, "70", as a result of which the motor is accelerated, due to a decrease in load, and the pointer of the speedometer 38 is caused to move onwardly beyond graduation "60", whereupon the valve 55 is moved from open position to a sufficiently closed position to cause the pointer of the speedometer to drop back to graduation "60" due to the fact that the load on the motor is slightly increased, incident to which increase in load the pointer of the indicator 45 moves from its negative "5" position toward the zero-point on the scale, thus enabling one to determine the excess horse-power output by reckoning its extent of movement, with the aid of the graduations of the scale 47, from its negative "5" position to its position of rest at the right thereof.

While the foregoing tests, which have been described with more or less particularity, in no sense constitute the entire field of tests with respect to which the apparatus may be employed, it is believed that they are of such a character and are so described in conjunction with the operation and function of the apparatus as a whole as to enable those skilled in the art to readily utilize the invention in the carrying out of the many tests for which it is intended and adapted in the automotive field.

Although only one form of the invention is herein shown and described, it will be understood that various changes and modifications with respect to details of construction and mode of operation may be made without departing from the spirit of the invention or the scope of the following claims.

What is claimed is:

1. A testing apparatus for the motor of an automotive vehicle comprising and endless track adapted to receive thereon and to be driven by the traction wheels of the vehicle when such wheels are operatively connected to the vehicle motor, a dynamometer unit connected to said track and including a liquid pump; a reservoir connected to the inlet of and adapted to contain a supply of liquid for said pump; a liquid conduit connected to the outlet of said pump and adapted to direct the liquid therefrom back into said reservoir; a load-valve disposed in said conduit; and a power meter including a pressure pipe connected to said conduit and shunted around said load-valve and through which liquid is adapted to pass, regulating valve means disposed in said pressure pipe and operable in conjunction with said load-valve for effecting various impedances to the flow of liquid through said conduit and said pressure pipe and for effecting various pressures in said pressure pipe, and indicator means connected to said pressure pipe and responsive to the pressure therin as determined by positions of adjustment of said load-valve and of said regulating valve means for indicating the power output of the vehicle motor.

2. A testing apparatus for the motor of an automotive vehicle comprising an endless track adapted to receive thereon and to be driven by the traction wheels of the vehicle when such wheels are operatively connected to the vehicle motor; a dynamometer unit connected to said track and including a liquid pump; a reservoir connected to the inlet of and adapted to contain a supply of liquid for said pump; a liquid conduit connected to the outlet of said pump and adapted to direct the liquid therefrom back into said reservoir; a load-valve disposed in said conduit; and a power meter including a pressure pipe connected to said conduit and shunted around said load-valve and through which liquid is adapted to pass, a pair of regulating valves disposed in said pressure pipe and operable in conjunction with said load-valve for effecting various impedances to the flow of liquid through said conduit and said pressure pipe and for effecting various pressures in said pressure pipe along different lengths thereof, and a pair of indicators connected to said pressure pipe and respectively responsive to the pressure within said pipe lengths as determined by positions of adjustment of said load-valve and of said regulating valves for indicating the power output of the vehicle motor.

3. A testing apparatus for the motor of an automotive vehicle comprising an endless track adapted to receive thereon and to be driven by the traction wheels of the vehicle when such wheels are operatively connected to the vehicle motor; a dynamometer unit connected to said track and including a liquid pump; a reservoir connected to the inlet of and adapted to contain a supply of liquid for said pump; a liquid conduit connected to the outlet of said pump and adapted to direct the liquid therefrom back into said reservoir; a load-valve disposed in said conduit; and a power meter including a pressure pipe connected to said conduit and shunted around said load-valve and through which liquid is adapted to pass, a pair of regulating valves disposed in said pressure pipe and operable in conjunction with said load-valve for effecting various impedances to the flow of liquid through said conduit and said pressure pipe and for effecting various pressures in said pressure pipe along different lengths thereof, and a pair of indicators connected to said pressure pipe and respectively responsive to the pressure within said pipe lengths as determined by positions of adjustment of said load-valve and of said regulating valves for indicating the power output of the vehicle motor, one of said indicators being of a micrometrically responsive character with respect to the other indicator, each of said indicators including a relatively movable pointer and graduated scale, the scale of said other indicator in conjunction with its associated pointer being readable in definite units of value, and the scale of said one indicator in conjunction with its associated pointer being readable in fractions of said units of value.

4. A testing apparatus for the motor of an automotive vehicle comprising an endless track adapted to receive thereon and to be driven by the traction wheels of the vehicle when such wheels are operatively connected to the vehicle motor; a dynamometer unit connected to said track and including a liquid pump; a reservoir connected to the inlet of and adapted to contain a supply of liquid for said pump; a liquid conduit connected to the outlet of said pump and adapted to direct the liquid therefrom back into said reservoir; a load-valve disposed in said conduit; and a power meter including a pressure pipe connected to said conduit and shunted around said load-valve and through which liquid is adapted to pass, a pair of regulating valves disposed in said pressure pipe and operable in conjunction with said load-valve for effecting various impedances to the flow of liquid through said conduit and said pressure pipe and for effecting various pressures in said pressure pipe along different lengths thereof, and a pair of indicators connected to said pressure pipe and respectively responsive to the pressure within said pipe lengths as determined by positions of adjustment of said load-valve and of said regulating valves for indicating the power output of the vehicle motor, one of said indicators being of a micrometrically responsive character with respect to the other indicator, each of said indicators including a relatively movable pointer and graduated scale, the scale of said other indicator in conjunction with its associated pointer being readable in definite units of value, and the scale of said one indicator in conjunction with its associated pointer being readable in both plus and minus fractions of said units of value as reckoned from a zero scale graduation whereby the position of the pointer of said other indicator with reference to a definite graduation of its scale may be accurately determined.

5. A testing apparatus for the motor of an automotive vehicle comprising an endless track adapted to receive thereon and to be driven by the traction wheels of the vehicle when such wheels are operatively connected to the vehicle motor; a dynamometer unit connected to said track and including a liquid pump; a reservoir connected to the inlet of and adapted to contain a supply of liquid for said pump; a liquid conduit connected to the outlet of said pump and adapted to direct the liquid therefrom back into said reservoir; a load-valve disposed in said conduit; a power meter including a pressure pipe connected to said conduit and shunted around said load-valve and through which liquid is adapted to pass, regulating valve means disposed in said pressure pipe and operable in conjunction with said load-valve for effecting various impedances to the flow of liquid through said conduit and said pressure pipe and for effecting various pressures in said pressure pipe, and indicator means connected to said pressure pipe and responsive to the pressure therein as determined by positions of adjustment of said load-valve and of said regulating valve means for indicating the power output of the vehicle motor; and protective means for said power meter including a shunt conduit shunted around said regulating valve means, and a pressure relief valve normally maintaining said shunt conduit closed and adapted to respond to a predetermined pressure to open that conduit.

6. A testing apparatus for the motor of an automotive vehicle comprising an endless track adapted to receive thereon and to be driven by the traction wheels of the vehicle when such wheels are operatively connected to the vehicle motor; a dynamometer unit connected to said track and including a liquid pump; a reservoir connected to the inlet of and adapted to contain a supply of liquid for said pump; a liquid conduit connected to the outlet of said pump and adapted to direct the liquid therefrom back into said reservoir; a load-valve disposed in said conduit; a power meter including a pressure pipe connected to said conduit and shunted around said load-valve and through which liquid is adapted to pass, a pair of regulating valves disposed in said pressure pipe and operable in conjunction with said load-valve for effecting various impedances to the flow of liquid through said conduit and said pressure pipe and for effecting various pressures in said pressure pipe along different lengths thereof, a pair of indicators connected to said pressure pipe and respectively responsive to the pressure within said pipe lengths as determined by positions of adjustment of said load-valve and of said regulating valves for indicating the power output of the vehicle motor, and protective means for said power meter including a shunt conduit adapted to afford a by-pass about one of said regulating valves and a pressure-relief valve normally maintaining said shunt conduit closed and adapted to respond to a predetermined pressure to open that conduit.

7. A testing apparatus for the motor of the automotive vehicle comprising an endless track adapted to receive thereon and to be driven by the traction wheels of the vehicle when such wheels are operatively connected to the vehicle motor; a dynamometer unit connected to said track and including a liquid pump; a reservoir connected to the inlet of and adapted to contain a supply of liquid for said pump; a liquid conduit connected to the outlet of said pump and adapted to direct the liquid therefrom back into said reservoir; a load-valve disposed in said conduit; a power meter including a pressure pipe connected to said conduit and shunted around said load-valve and through which liquid is adapted to pass, a pair of regulating valves disposed in said pressure pipe and operable in conjunction with said load-valve for effecting various impedances to the flow of liquid through said conduit and said pressure pipe and for effecting various pressures in said pressure pipe along different lengths thereof, and a pair of indicators connected to said pressure pipe and respectively responsive to the pressure within said pipe lengths as determined by positions of adjustment of said load-valve and of said regulating valves for indicating the power output of the vehicle motor, one of said indicators being of a micrometrically responsive character with respect to the other indicator, each of said indicators including a relatively movable pointer and graduated scale, the scale of said other indicator in conjunction with its associated pointer being readable in definite units of value, and the scale of said one indicator in conjunction with its associated pointer being readable in fractions of said units of value; and protective means for said power meter including a shunt conduit adapted to afford a by-pass from said micrometrically responsive indicator about the regulating valve corresponding to that indicator and a pressure-relief valve normally maintaining said shunt conduit closed and adapted to respond to a predetermined pressure to open that conduit.

8. A testing apparatus for the motor of an automotive vehicle comprising an endless track adapted to receive thereon and to be driven by the traction wheels of the vehicle when such wheels are operatively connected to the vehicle motor, a dynamometer unit connected to said track and including a liquid pump; a liquid conduit connected to the outlet of said pump; a load-valve disposed in said conduit; and a power meter including a pressure pipe connected to said conduit and shunted around said load-valve and through which liquid is adapted to pass, regulating valve means disposed in said pressure pipe and operable in conjunction with said load-valve for effecting various impedances to the flow of liquid through said conduit and said pressure pipe and for effecting various pressures in said pressure pipe, and indicator means connected to said pressure pipe and responsive to the pressure therein as determined by positions of adjustment of said load-valve and of said regulating valve means for indicating the power output of the vehicle motor.

9. A testing apparatus for the motor of an automotive vehicle comprising an endless track adapted to receive thereon and to be driven by the traction wheels of the vehicle when such wheels are operatively connected to the vehicle motor, a dynamometer unit connected to said track and including a liquid pump; a liquid conduit connected to the outlet of said pump; a load-valve disposed in said conduit; and a power meter including a pressure pipe connected to said conduit and shunted around said load-valve and through which liquid is adapted to pass, a pair of regulating valves disposed in said pressure pipe and operable in conjunction with said load-valve for effecting various impedances to the flow of liquid through said conduit and said pressure pipe and for effecting various pressures in said pressure pipe along different lengths thereof, and a pair of indicators connected to said pressure pipe and respectively responsive to the pressure within said pipe lengths as determined by positions of adjustment of said load-valve and of said regulating valves for indicating the power output of the vehicle motor.

10. A testing apparatus for the motor of an automotive vehicle comprising an endless track adapted to receive thereon and to be driven by the traction wheels of the vehicle when such wheels are operatively connected to the vehicle motor; a dynamometer unit connected to said track and including a liquid pump; a liquid conduit connected to the outlet of said pump; a load-valve disposed in said conduit; a power meter including a pressure pipe connected to said conduit and shunted around said load-valve and through which liquid is adapted to pass, regulating valve means disposed in said pressure pipe and operable in conjunction with said load-valve for effecting various impedances to the flow of liquid through said conduit and said pressure pipe and for effecting various pressures in said pressure pipe, and indicator means connected to said pressure pipe and responsive to the pressure therein as determined by positions of adjustment of said load-valve and of said regulating valve means for indicating the power output of the vehicle motor; and protective means for said power meter including a shunt conduit shunted around said regulating valve means, and a pressure-relief valve normally maintaining said shunt conduit closed and adapted to respond to a predetermined pressure to open that conduit.

11. A testing apparatus for the motor of an automotive vehicle comprising an endless track adapted to receive thereon and to be driven by the traction wheels of the vehicle when such wheels are operatively connected to the vehicle motor; a dynamometer unit connected to said track and including a liquid pump; a liquid conduit connected to the outlet of said pump; a load-valve disposed in said conduit; a power meter including a pressure pipe connected to said conduit and shunted around said load-valve and through which liquid is adapted to pass, a pair of regulating valves disposed in said pressure pipe and operable in conjunction with said load-valve for effecting various impedances to the flow of liquid through said conduit and said pressure pipe and for effecting various pressures in said pressure pipe along different lengths thereof, a pair of indicators connected to said pressure pipe and respectively responsive to the pressure within said pipe lengths as determined by positions of adjustment of said load-valve and of said regulating valves for indicating the power output of the vehicle motor; and protective means for said power meter including a shunt conduit adapted to afford a by-pass about one of said regulating valves and a pressure-relief valve normally maintaining said shunt conduit closed and adapted to respond to a predetermined pressure to open that conduit.

12. A testing apparatus for the motor of an automotive vehicle comprising an endless track adapted to receive thereon and to be driven by the traction wheels of the vehicle when such wheels are operatively connected to the vehicle motor; a dynamometer unit connected to said track and including a liquid pump; a liquid conduit connected to the outlet of said pump; a load-valve disposed in said conduit; and a power meter including a pressure pipe connected to said conduit and shunted around said load-valve and through which liquid is adapted to pass, a pair of regulating valves disposed in said pressure pipe and operable in conjunction with said load-valve for effecting various impedances to the flow of liquid through said conduit and said pressure pipe and for effecting various pressures in said pressure pipe along different lengths thereof, and a pair of indicators connected to said pressure pipe and respectively responsive to the pressure within said pipe lengths as determined by positions of adjustment of said load-valve and of said regulating valves for indicating the power output of the vehicle motor, one of said indicators being of a micrometrically responsive character with respect to the other indicator, each of said indicators including a relatively movable pointer and graduated scale, the scale of said other indicator in conjunction with its associated pointer being readable in definite units of value, and the scale of said one indicator in conjunction with its associated pointer being readable in fractions of said units of value.

13. A testing apparatus for the motor of an automotive vehicle comprising an endless track adapted to receive thereon and to be driven by the traction wheels of the vehicle when such wheels are operatively connected to the vehicle motor; a dynamometer unit connected to said track and including a liquid pump; a liquid conduit connected to the outlet of said pump; a load-valve disposed in said conduit; and a power meter including a pressure pipe connected to said conduit and shunted around said load-valve and through which liquid is adapted to pass, a pair of regulating valves disposed in said pressure pipe and operable in conjunction with said load-valve for effecting various impedances to the flow of liquid through said conduit and said pressure pipe and for effecting various pressures in said pressure pipe along different lengths thereof, and a pair of indicators connected to said pressure pipe and respectively responsive to the pressure within said pipe lengths as determined by positions of adjustment of said load-valve and of said regulating valves for indicating the power output of the vehicle motor, one of said indicators being of a micrometrically responsive character with respect to the other indicator, each of said indicators including a relatively movable pointer and graduated scale, the scale of said other indicator in conjunction with its associated pointer being readable in definite units of value, and the scale of said one indicator in conjunction with its associated pointer being readable in both plus and minus fractions of said units of value as reckoned from a zero scale graduation whereby the position of the pointer of said other indicator with reference to a definite graduation of its scale may be accurately determined.

MORGAN J. LEWIS.